United States Patent [19]

Meng

[11] Patent Number: 5,359,951
[45] Date of Patent: Nov. 1, 1994

[54] ACTIVE TURBULENCE CONTROL USING MICROELECTRODES, PERMANENT MAGNETS IN MICROGROOVES

[75] Inventor: James C. S. Meng, Portsmouth, R.I.

[73] Assignee: The United States of America as represented by the Secretary of the Navy, Washington, D.C.

[21] Appl. No.: 16,326

[22] Filed: Feb. 11, 1993

[51] Int. Cl.⁵ ............................................. B63B 1/34
[52] U.S. Cl. ............................................. 114/67 R
[58] Field of Search ................ 114/56, 61, 67 R, 289, 114/290; 440/6, 38; 244/130, 200, 204, 205

[56] References Cited

U.S. PATENT DOCUMENTS

| | | | |
|---|---|---|---|
| 2,875,720 | 3/1959 | Hupp | 114/290 |
| 3,360,220 | 12/1967 | Meyer | 244/205 |
| 5,133,516 | 7/1992 | Marentic et al. | 244/200 |
| 5,273,465 | 12/1993 | Meng | 440/6 |

Primary Examiner—Edwin L. Swinehart
Attorney, Agent, or Firm—Michael J. McGowan; Prithvi C. Lall; Michael F. Olgo

[57] ABSTRACT

Electrodes and magnets are disposed in alternating relation on confronting surfaces of microgrooves that respectively produce electric and magnetic fields that are cooperative to provide a force that acts along a flow direction defined between a vessel and a relatively moving medium to controllably diminish turbulence generation in seawater.

5 Claims, 1 Drawing Sheet

ACTIVE TURBULENCE CONTROL USING MICROELECTRODES, PERMANENT MAGNETS IN MICROGROOVES

STATEMENT OF GOVERNMENT INTEREST

The invention described herein may be manufactured and used by or for the Government of the United States of America for governmental purposes without the payment of any royalties thereon or therefor.

CROSS REFERENCES TO RELATED PATENT APPLICATIONS

The instant application is related to my four co-pending U.S. patent applications entitled SUPERCONDUCTING ELECTROMAGNETIC TORPEDO LAUNCHER, U.S. Pat. No. 5,284,106; SUPERCONDUCTING ELECTROMAGNETIC THRUSTER, Ser. No. 08/016,324, filed Feb. 11, 1993, now U.S. Pat. No. 5,333,444; MAGNETOSTRICTIVE BOUNDARY LAYER CONTROL SYSTEM, U.S. Pat. No. 5,273,465; and SEAWATER MAGNETOHYDRODYNAMIC TEST APPARATUS, pending U.S. Ser. No. 08/016,328, filed Feb. 11, 1993 having same filing date.

BACKGROUND OF THE INVENTION (1) Field of the Invention

This invention is drawn to the field of fluid mechanics, and more particularly, to a novel electromagnetic turbulent boundary layer controller.

(2) Description of the Prior Art

At the interface between a moving marine vessel and its medium, turbulence phenomena exhibit themselves, which, for reasons well known to those skilled in the art, often call for some measure of control. By controllably changing the flow or fluid properties of the medium at the interface, the turbulence may be correspondingly controlled. As one example of a heretofore known fluid or flow turbulence control technique, it is known that polymers locally injected along the interface effect a measure of turbulence control. The long molecular polymeric chains are stretched out and they uncoil themselves along the direction of flow and by action of forming a viscosity gradient with the medium, are able to dampingly absorb energy in directions generally perpendicular to the direction of stretching. Another such heretofore known turbulence control technique deploys a negative pressure porous surface that controllably siphons off the medium below the interface turbulence boundary layer, thereby controllably changing the characteristics of the flow, and therewith control the measure 12 of turbulence generated. These techniques pay the penalties of needing to store a reservoir of polymer or other injectant and of needing to provide a reserve of ready power to suction off the medium, which are undesirable in many applications environments.

Furthermore, it is known that by controllably changing the character of the turbulent boundary layer formed around the surface of the vessel, the turbulence production in the boundary layer may be correspondingly controlled. As one example of a turbulent boundary layer turbulence control technique, it is known that 100 micron ribs spaced apart on 100 micron centers in a so-called riblet (see-saw) geometry acts within the turbulent boundary layer to controllably lessen the quantity of turbulence generated at the interface a few percent compared to an unribbed vessel. As another example, the turbulent boundary layer may be advantageously affected by ultrasonically adding energy to the medium locally along the interface in directions generally perpendicular to the flow direction. Ultrasonic turbulent boundary layer control techniques, however, pay the penalty of a comparatively-high power consumption, with all it's attendant disadvantages, and are accompanied by a comparatively-high level of emanated noise.

SUMMARY OF THE INVENTION

It is accordingly a principal object of the present invention to provide an electromagnetic turbulence controller. In accord therewith, the electromagnetic turbulence controller of the present invention contemplates energizable means for providing an electromagnetic field along the interface along which turbulence is to be controlled and further contemplates magnet means for providing a magnetic field along the interface along which turbulence is to be controlled, the electromagnetic and magnetic fields cooperating to produce a Lorentz force that acts along the flow direction and adds energy to the medium controllably altering the turbulent boundary layer and therewith controllably diminishing turbulence along the interface of the marine vessel and its seawater medium. In one presently preferred embodiment, confronting spaced-apart electrodes of electric field emanating material and magnetic field producing material that are elongated along the direction of flow are disposed about the interface defined by the vessel with its medium in alternating relation. The electric and magnetic fields interact to produce Lorentz forces that act everywhere locally in directions generally parallel to each other and parallel to the direction of flow. In one preferred embodiment thereof, the electromagnetic field producing electrodes are fabricated on the surfaces of microgrooves by depositing a conductive material, such as platinum or silver, thereon, and the magnetic field emanating electrodes are fabricated on the surfaces of microgrooves by depositing a permanent magnetic material, such as Nd-B-Fe, thereon. In this embodiment, the microgrooves are 100 micron high and are spaced-apart on 100 micron centers in a "see-saw" geometry.

BRIEF DESCRIPTION OF THE DRAWINGS

These and other objects, features and advantages of the present invention will become apparent as the invention becomes better understood by referring to the following detailed description of the preferred embodiment thereof and to the drawings, wherein.

DETAILED DESCRIPTION OF THE PREFERRED EMBODIMENTS

Figure 1:
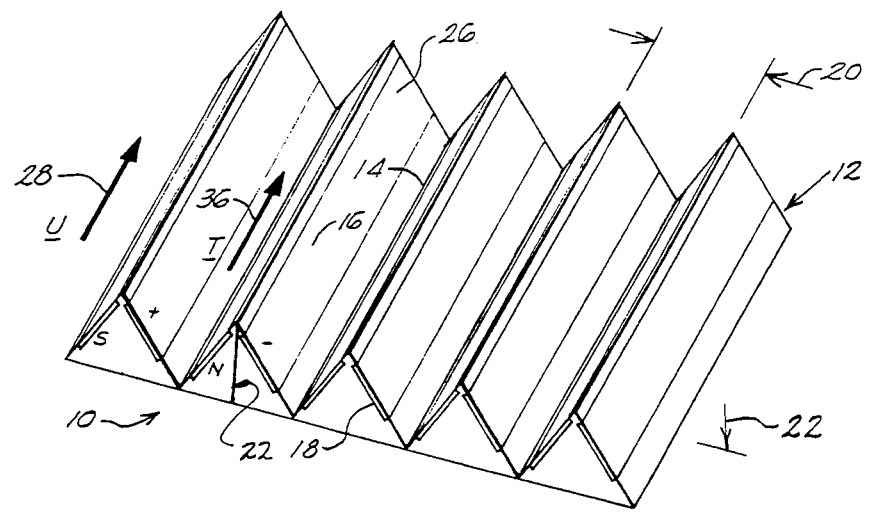
FIG. 1 is a perspective diagram illustrating the presently preferred embodiment of the electromagnetic turbulence controller of the present invention.

Referring now to FIG. 1, the preferred embodiment generally designated 10 of an electromagnetic turbulence controller in accord with the present invention is seen to include a surface generally designated 12 constituted as plural ribs 14. The ribs 14 have a "V-shaped" cross-section defined by constitutive confronting riblets 16, 18 in alternating relation. The ribs 14 are elongated along the direction of flow. The constitutive riblets 16, 18 thereof preferably define a forty-five (45) degree spacial angle therebetween.

In the presently preferred embodiment, the riblets 16, 18 of the V-shaped ribs 14 of the structure 12 are spaced-apart a distance designated by arrows 20 of one hundred (100) microns, and are upstanding a distance designated 22, again of one hundred (100) microns. Any suitable structure 12, such as the "microgrooves" commercially available from the 3-M Company, may be employed. Whichever structure 12 is employed, it is only important that the dimensions thereof be selected to lie within the turbulent boundary layer.

Each of the constitutive confronting vanes 16, 18 of the several V-shaped ribs 14 of the structure 12 are respectively provided with an electrically conductive electrode generally designated 24, such as platinum or silver, and a magnet generally designated 26. The electrodes 24 thereof extend along the direction of elongation of each of the vanes, and may be provided as a thin film, preferably twenty (20) microns thick, by sputter deposition, and thin film deposition, chemical vapor deposition, among other techniques well known to those skilled in the art. The magnets 26 thereof likewise extend along each of the vanes, and may be provided as a thin film, preferably twenty (20) microns thick, of Nd-B-Fe, or other suitable permanent magnetic material, by these same techniques. The magnets 26 on corresponding vanes of adjacent ribs are alternatively of north and south magnetic polarity. Flow direction is schematically represented by a vector 28 marked "U" which is parallel to the direction of elongation of the constitutive confronting vanes 16, 18 of the several ribs 14.

Figure 2:
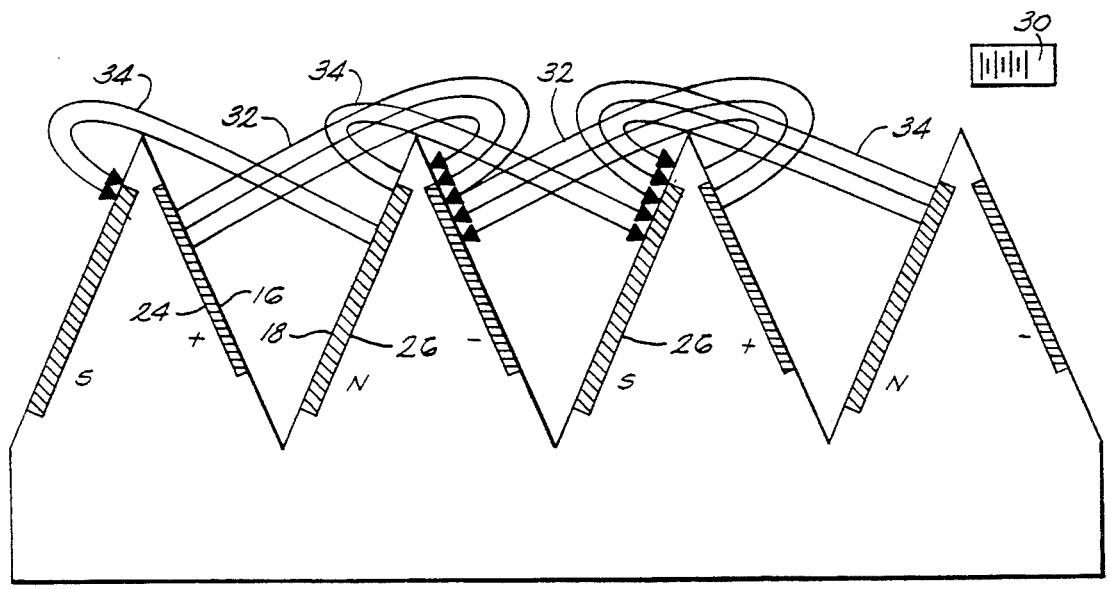
FIG. 2 is a sectional diagram useful in explaining the operation of the preferred embodiment of the electromagnetic turbulence controller of the present invention.

As best seen in FIG. 2, alternating ones of the electrodes 24 of the vanes 16, 18 of adjacent V-shaped ribs 14 are electrically connected in parallel to an anode and a cathode respectively of an energy source schematically illustrated at 30. When energized, electromagnetic field lines emanate from the anodes and terminate on the cathodes immediately to either side thereof as illustrated by field lines 32 in FIG. 2, and off each magnet 26 of north polarity a magnetic field emanates that is terminated on the corresponding magnets of south polarity of adjacent ribs as illustrated by field lines 34.

Returning now to FIG. 1, the electric and magnetic fields interact in the interspace defined by adjacent ribs, and produce a Lorentz force 36 marked "T" that acts parallel to the flow direction 28 in accord with the "right-hand" rule. Force is thereby applied to the medium along the flow direction, which accelerates the medium locally along the vessel where most of the turbulence is produced. The energy added thereby disrupts the turbulent boundary layer in such a way as to controllably lessen turbulence production along the flow direction.

Many modifications of the presently disclosed invention will become apparent to those skilled in the art without departing from the scope of the appended claims.

What is claimed is:

1. An electromagnetic turbulence controller that controls turbulence generated by a vessel as it experiences relative motion with an electrically conducting medium along a direction, said controller comprising:
   at least one pair of spaced-apart anode and cathode electrodes that are elongated at least along said direction;
   at least one pair of north and south magnetic poles elongated at least along said direction which are in alternating relation with said at least one pair of spaced-apart anode and cathode electrodes; and
   said at least one pair of anode and cathode electrodes are formed in a predetermined manner along constitutive confronting vanes of v-shaped ridges that are elongated along said direction.

2. The invention of claim 1, wherein said predetermined manner is chemical vapor deposition.

3. The invention of claim 1, wherein said predetermined manner is sputter deposition.

4. The invention of claim 1, wherein said predetermined matter is thin film deposition.

5. The invention of claim 1, wherein said ribs are the constitutive surface of a microgroove structure having upstanding walls of about 100 microns that are spaced apart about 100 microns.

* * * * *